July 3, 1928.

B. A. KRAFFT

SAFETY COVER FOR COOKING VESSELS

Filed Nov. 14, 1923

1,676,146

INVENTOR

Patented July 3, 1928.

1,676,146

UNITED STATES PATENT OFFICE.

BRUNO A. KRAFFT, OF SAN FRANCISCO, CALIFORNIA.

SAFETY COVER FOR COOKING VESSELS.

Application filed November 14, 1923. Serial No. 674,767.

This invention relates to domestic cooking utensils and has for its particular object to provide a safety covering which may be placed on a pot or kettle to prevent its contents from boiling over or evaporating too rapidly, to retain the flavors and essences, and to prevent loss of heat, and which will be simple in construction, cheap to manufacture, and easy to clean.

Figure 1:
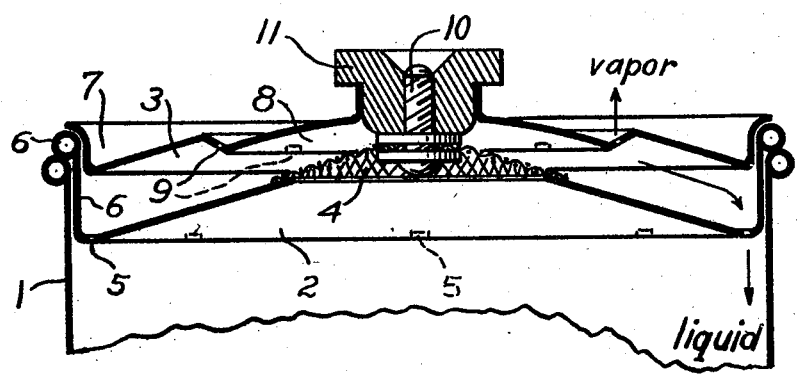
Figure 2:
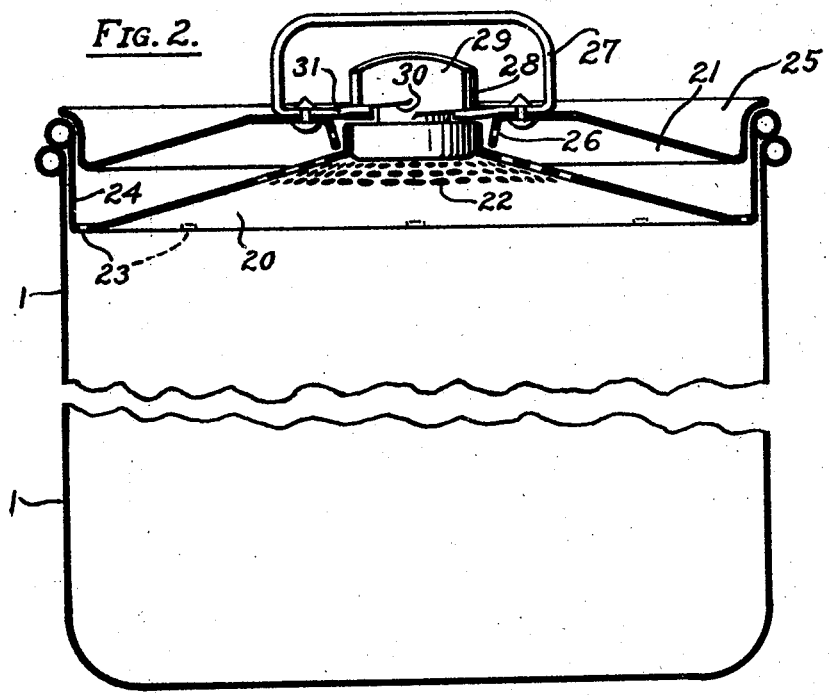

Fig. 1 is a cross-sectional view of a portion of the pot or kettle with one form of safety covering thereon; Fig. 2 is a cross-sectional view of a portion of the pot or kettle with another form of safety covering thereon.

The illustration on Fig. 1 of the drawing shows one form in which the invention may be embodied, but it is to be understood that the forms and proportions of parts may be varied, and that suitable handles may be attached wherever desired.

The pot or kettle 1 has seated within its periphery an inner cover 2, and over this inner cover is an outer cover 3. The inner cover 2 extends over substantially the entire interior of the vessel 1 and is preferably cone-shaped throughout the greater portion of the distance from its center to its circumference but has a large opening therethrough near the center thereof with a screen 4 secured over or adjacent this opening. Around the outer periphery of the conical portion of the inner cover 2 are a number of holes 5 to allow the material which has boiled over through the screen 4, as well as the liquid that has condensed on the under side of the outer cover 3, to flow back into the vessel. The holes 5 should be slightly larger than the openings through the screen 4 so that solid particles which escape through the screen 4 will be washed back into the vessel again. The inner cover 2 has an upwardly extending rim or flange 6 adapted to telescope into the upper periphery of the vessel 1 and support the weight of the inner cover thereon. The outer cover 3 has a suitably formed peripheral flange 7 for supporting it on the flange 6 of the inner cover. A dome 8 is formed centrally of the outer cover 3 and preferably integral therewith to stop any material which may boil over through the opening or screen 4 and to cause such material to be deflected sidewise towards the openings 5. Around the periphery of the dome is an annular offset portion provided with small openings 9 to allow the escape of vapor so as to prevent any rise of pressure in the interior of the vessel. These perforations are arranged facing downwardly towards the periphery of the vessel so that they will not be struck by the direct spray of the liquid boiling over through the opening or screen 4 but will allow superfluous vapor to escape freely. A fastening device in the form of a screw post 10 with double or triple threads is secured in any suitable manner to the central portion of the screen 4 and extends upwardly therefrom. A complementary fastening device in the form of a knob 11 is secured centrally of the outer cover 3 and has a screw threaded hole therethrough to receive the screw post 10 so that the operator by taking hold of the knob 11 can remove both the inner and outer covers together, or by giving the knob a slight turn so as to unscrew it from the post 10 can remove the outer cover only and leave the inner cover remain in operative position on the vessel.

The illustration on Fig. 2 of the drawing shows another form in which the invention may be embodied. The pot or kettle 1 is similar to that shown in Fig. 1 and has seated within its upper periphery an inner cover member 20 and an outer cover member 21 spaced vertically therefrom, both extending over substantially the entire interior of the vessel 1. The inner cover 20 has small openings 22 through its central portion to allow the boiling material to escape, and preferably also a series of peripheral openings 23 close around the margin of the inner cover 20 to permit the boiled over material to flow back into the vessel. The inner cover 20 carries on its periphery an upwardly extending flange 24 to support it upon the uppermost periphery of the vessel 1, and within this flange is seated the peripheral portion 25 of the outer cover 21. The middle portion of the outer cover 21 is formed with a large opening therethrough bounded by the downwardly extending flange or rim 26 which fits closely around the periphery of the knob 28, to be described hereinafter, so as to prevent too much steam or boiling liquid from escaping at this point. A handle member 27 is secured to the outer cover closely adjacent the flange 26 and may be of any desired shape but preferably extends transversely across the large opening in the outer cover. The upper portion of the handle member 27 is formed flat or horizontal so that a weight may be placed upon it to assist in holding the cover members on the vessel, and if that is not sufficient the bail of the vessel 1 may be brought into vertical position so as to extend over the flat horizontal portion of the handle 27 to hold the covers in place. Since cooking vessels with bails thereon are old and well-known, I have not illustrated the same in detail on the drawing, the present invention being confined entirely to the construction of the cover members themselves. The inner cover member has mounted centrally thereon a handle member, preferably in the form of a knob 28, extending upwardly through the opening in the outer cover formed by the flange or rim 26 and having its free end normally accessible to the hand of the operator. The knob 28 has two opposite sides flattened as shown at 29 and the two alternate sides formed with suitable fastening means in the form of inclined slots 30 for receiving complementary fastening means on the outer cover in the form of inwardly turned ends 31 of the handle member 27. The slots 30 in conjunction with the inwardly turned ends 31 function like an interrupted screw thread so that the two cover members may be readily connected together or disconnected from each other by relative rotation. Lateral displacement of the outer cover is at all times prevented by the centering effect of the knob 28, even if the outer cover should be lifted by the steam pressure from within while the inturned ends 31 of the handle 27 are adjacent the flattened sides 29.

Claims:

1. A covering for a cooking vessel comprising spaced apart inner and outer cover members each extending over substantially the entire interior of the vessel, said inner cover having openings therethrough near the center thereof to permit the boiling material to escape, said outer cover having a large opening through its middle portion, and an upwardly extending handle member mounted on the inner cover and extending through said large opening and having its upper portion normally accessible to the hand of the operator while the outer cover is in place.

2. A covering for a cooking vessel comprising spaced apart inner and outer cover members each extending over substantially the entire interior of the vessel, said inner cover having openings therethrough near the center thereof to permit the boiling material to escape, said outer cover having a large opening through its middle portion, an upwardly extending handle member mounted on the inner cover and extending through said large opening and having its upper portion normally accessible to the hand of the operator, and a transversely arranged handle on the outer cover extending across said large opening and across the top of said first mentioned handle member.

3. A covering for a cooking vessel comprising an inner cover extending over substantially the entire interior of the vessel and having openings therethrough near the center thereof to permit the boiling material to escape, a flange extending upwardly from the periphery of the inner cover adapted to be seated frictionally within the uppermost periphery of the vessel, a separable outer cover extending over and spaced vertically from the inner cover throughout substantially the entire interior of the vessel, the peripheral portion of the outer cover being fitted to normally rest upon the top of said flange and have its weight supported thereby, said outer cover having a large opening through the middle thereof, and a handle member mounted on the inner cover and having its upper portion projecting through the opening in the outer cover so as to be readily accessible to the hand of the operator.

4. A covering for a cooking vessel comprising an inner cover in the form of a broad cone extending over the entire interior of the vessel and having a vertical peripheral flange formed directly thereon and adapted to be seated frictionally within the uppermost periphery of the vessel, said flange having its uppermost edge turned outwardly so as to support the weight of the inner cover directly upon the uppermost edge of the vessel, the conical portion of said inner cover having openings therethrough adjacent the center thereof and other openings adjacent the periphery of the vessel, the peripheral openings being at the lowermost points of said inner cover and on the line where the conical portion intersects the upturned flange, an upwardly projecting handle member mounted centrally on said inner cover at the apex of the conical portion, and an outer cover fitted to the flange of the inner cover and having a large central opening through and beyond which said handle member projects.

BRUNO A. KRAFFT.